June 3, 1941.                O. J. VERRETT                2,244,270
                            FISHHOOK EXTRACTOR
                            Filed Feb. 3, 1940
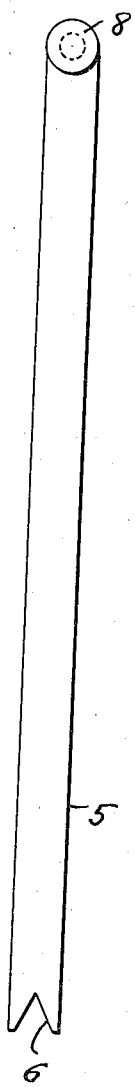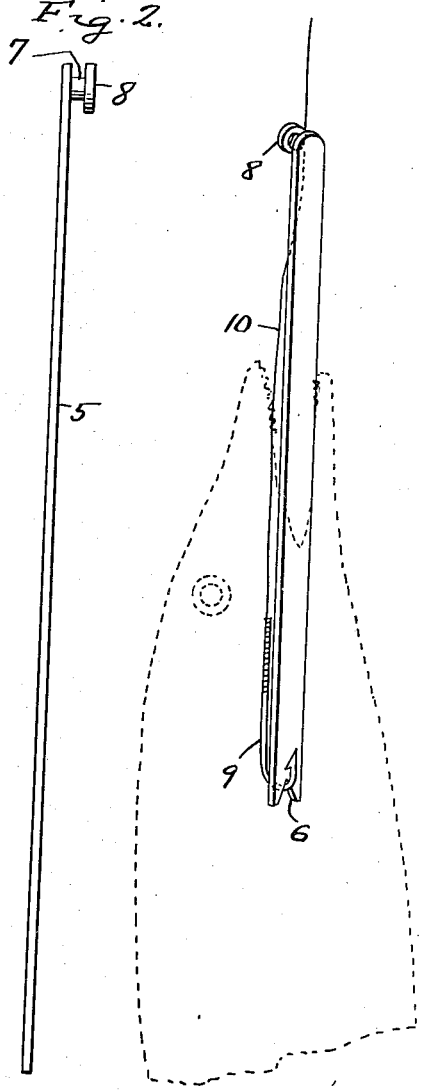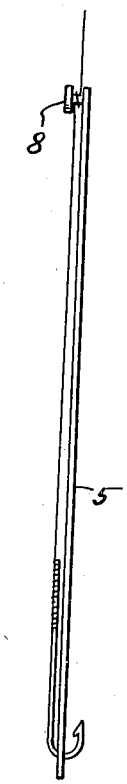
Inventor
Ovila J. Verrett
By Clarence A. O'Brien
and Hyman Berman
Attorneys Patented June 3, 1941

2,244,270

UNITED STATES PATENT OFFICE 2,244,270

FISHHOOK EXTRACTOR

Ovila J. Verrett, Syracuse, N. Y.

Application February 3, 1940, Serial No. 317,189

1 Claim. (Cl. 43—29)

The present invention relates to new and useful improvements in fish hook extractors and has for its primary object to provide a device of this character whereby a lodged hook may be extracted from a caught fish with a minimum of injury to the same.

Other objects of the invention are to provide a fish hook extractor which will be strong and reliable in use, durable, light in weight, and which may be manufactured at low cost.

Still further objects and advantages of the invention will become apparent from a study of the following detailed description, taken in connection with the accompanying drawing, wherein like characters of reference designate corresponding parts, and wherein—

Figure 1 is a front elevational view of my invention.

Figure 2 is a side elevational view of my invention.

Figure 3 is a perspective view of my invention, shown in operative position.

Figure 4 is a side elevational view of the invention shown in hook extracting position.

Referring now to the drawing in detail, it will be seen that the reference numeral 5 designates a length of suitable strap metal, which has a V-shaped notch 6 formed at its lower end, while its upper end is rounded and has extending from one side thereof a small shank 7 which has a head 8 formed thereon.

The operation of the device is as follows:

The notched end 6 of the device is inserted into the mouth of a fish until the notched portion 6 straddles the hook 9, at which time the line 10 is drawn taut and wrapped around the shank 7 as shown in Fig. 4 of the drawing. In this position the extractor may then be manipulated to disengage the hook within the fish in such a manner as to hold the fish's mouth open and at the same time remove the hook therefrom.

Although I have shown and described herein a preferred embodiment of my invention, it is to be definitely understood that I do not desire to limit the application of the invention thereto, and any change or changes may be made in the material and structure of the same within the spirit of the invention as claimed.

What is claimed is:

A fish hook extractor comprising a substantially flat straight elongated member having a V-shaped notch in its bottom end portion to provide a pair of prongs of equal length for straddling a portion of a lodged fish hook, a shank of uniform diameter extending laterally from one side of said elongated member in spaced relation to the top end thereof for engagement by a line attached to said fish hook to hold said fish hook portion in said V-shaped notch in said elongated member while removing said fish hook from lodged position in a fish, and a disk head on said shank having a portion of its periphery substantially in a plane with the top end of the elongated member to retain said line engaged on said shank.

OVILA J. VERRETT.